United States Patent
Choi

[19]

[11] Patent Number: 5,976,209
[45] Date of Patent: Nov. 2, 1999

[54] MELT BLOWN PRODUCT FORMED AS A FIBROUS LAYERED WEB OF FILTER MEDIA

[75] Inventor: Kyung-Ju Choi, Jefferson County, Ky.

[73] Assignee: AAF International, Louisville, Ky.

[21] Appl. No.: 09/195,282

[22] Filed: Nov. 18, 1998

Related U.S. Application Data

[62] Division of application No. 08/677,631, Jul. 8, 1996, Pat. No. 5,891,482.

[51] Int. Cl.[6] .................................................. B01D 39/16
[52] U.S. Cl. .......................... 55/482; 55/528; 55/DIG. 44
[58] Field of Search ............................. 55/482, 485, 522, 55/527, 528, DIG. 5, DIG. 44, 487, 488; 210/505; 264/258, 12, 103; 428/292.1, 357

[56] References Cited

U.S. PATENT DOCUMENTS

| | | | |
|---|---|---|---|
| 3,825,380 | 7/1974 | Harding et al. | 425/72 |
| 3,981,650 | 9/1976 | Page | 425/72 |
| 4,486,161 | 12/1984 | Middleton | 425/80.1 |
| 4,714,647 | 12/1987 | Shipp, Jr. et al. | 428/212 |
| 4,818,463 | 4/1989 | Buehning | 264/40.1 |
| 4,826,415 | 5/1989 | Mende | 425/722 |
| 4,925,601 | 5/1990 | Vogt et al. | 264/12 |
| 4,986,743 | 1/1991 | Buehning | 425/7 |
| 5,098,636 | 3/1992 | Balk | 264/555 |
| 5,149,468 | 9/1992 | Hershelman | 264/12 |
| 5,196,207 | 3/1993 | Koenig | 425/72.2 |
| 5,236,641 | 8/1993 | Allen et al. | 264/40.1 |
| 5,273,565 | 12/1993 | Milligan et al. | 55/528 |
| 5,340,479 | 8/1994 | Szczepanski | 210/505 |
| 5,487,655 | 1/1996 | Frey et al. | 425/72.2 |
| 5,523,033 | 6/1996 | Shambaugh | 264/6 |

*Primary Examiner*—Richard L. Chiesa
*Assistant Examiner*—Robert A. Hopkins
*Attorney, Agent, or Firm*—Polster, Lieder, Woodruff & Lucchesi

[57] ABSTRACT

A product wherein a layered web of melt blown fibrous filter media is produced by a unitary die including several die sources with facing layers of the fibrous filter media being attenuated by opposed fluid streams at preselected included angles and with the fiber layers being free from bonding together and with the fibers in each layer being minimally bonded.

6 Claims, 3 Drawing Sheets

MELT BLOWN PRODUCT FORMED AS A FIBROUS LAYERED WEB OF FILTER MEDIA

This application is a division of Ser. No. 08/677,631 filed Jul. 8, 1996, now U.S. Pat. No. 5,891,482.

BACKGROUND OF THE INVENTION

The present invention relates to a method, apparatus and product involving melt blowing systems and more particularly to an improved, highly efficient, low energy melt blowing process, a novel melt blowing die apparatus having a unique capability of accomplishing such process with a minimum of structural parts and a minimum of energy and a novel, highly efficient filter media product which can be readily produced by the inventive process and apparatus.

Non woven fiber mats formed by melt blowing dies and melt blowing processes for producing the same have been long known in the prior art. In this regard, attention is directed to the expired U.S. Pat. No. 3,825,380, issued to J. W. Harding et al on Jul. 23, 1974, which teaches the formation of such a fibrous mat from molten polymers by means of a longitudinally extending die apparatus having a triangular cross-sectional die nose configuration with a pair of oppositely directed attenuating air streams being directed along the die nose flanks toward centrally emitted melt blown fibers with the air streams flowing in opposed angular direction so as to include an angle therebetween in the range of thirty (30) to ninety (90) degrees, it being noted that the attenuated elongated fiber streams are cooled ambiently before collection on a screen as a web. In U.S. Pat. No. 4,714,647, issued to P. W. Shipp, Jr. et al on Dec. 22, 1987, sequentially deposited layers of melt blown thermoplastic filter fibers of different sizes are collected as a laminate web and in U.S. Pat. No. 5,236,641, issued to M. A. Allen et al on Aug. 17, 1993 melt blown polymer fibers are fed as strips to a collector by individually fed side-by-side melt blowing units, each unit having its through-put controlled to maintain the property in each strip at a predetermined value. Finally attention is directed to U.S. Pat. Nos. 4,486,161, issued to D. L. Middleton on Dec. 4, 1984; No. 4,818,463, issued to P. G. Buehning on Apr. 4, 1989; and No. 4,986,743, issued to P. G. Buehning on Jan. 22, 1991, each of which three aforesaid patents teaches a die tip structural arrangement for melt blown fiber material feeding.

Although the prior art teaches or suggests various overall die structures, die tip fluid material feeding structure and melt blowing processes, none teaches the unique and novel die construction, melt blowing process and resulting layered, fibrous filter web as is described herein.

In accordance with the novel features of the present invention, a straightforward, economical, easy to manufacture, easy to assemble and to maintain apparatus is provided, as is a unique melt blowing process requiring a straightforward and economical series of steps which provides an increase in fibrous filter media output with a minimum of energy consumption. In addition the present invention allows for straightforward and economical modifications in the novel process, apparatus and product to produce varying sizes and varying characteristic filter fibers in accordance with varying market demands. Further, the present invention provides a unique layered fibrous filter mat which serves to increase bulk with accompanying increased dust holding capacity and overall filtering efficiency.

Various other features of the present invention will become obvious to one skilled in the art upon reading the disclosure set forth herein.

BRIEF SUMMARY OF THE INVENTORY

More particularly the present invention provides a process for forming a layered web of fibrous filter media wherein adjacently facing layers of fibrous filter media are distinctly separate from each other comprising: sequentially feeding filter media fibers in heated and fiber attenuated form from heated melt blown die source orifices toward a spaced collector source to be layered as at least two separate and distinct layers of fibrous filter media onto the collector source with one fibrous filter media layer being on top of the other in faced relation; and, treating the fibers of the facing layers of fibrous filter media between the die source and before the collector source in order to enhance crystallization and to avoid bonding between adjacent media layer faces and to reduce bonding within each of the layers to increase the layered web of fibrous filter media in bulk with accompanying increased dust holding capacity and overall filtration efficiency. Further, the present invention provides a preselected included angle for fiber attenuating fluid streams wherein such attenuating fluid streams on either side of a fluid material stream are more in opposition to each other to provide a high velocity, turbulent, pulse-like sinusoidal flow from the fluid material outlet to increase the rate of fiber attenuation. In addition, the present invention provides a die apparatus for forming a layered web of fibrous filter media with the layers thereof distinctly separate from each comprising: a unitary die body formed from a preselected heat conductive material, the die body having formed therein at least two preselectively spaced fluid material flow-through passages, each material flow-through passage having a fluid material receiving inlet and a fluid material dispensing outlet adapted to dispense a row of layer forming fibers therefrom with the dispensed randomly oriented fiber layers to be collected in stacked, facing relation; the die body further having formed therein at least two pairs of oppositely disposed fluid attenuating flow-through passages, each having a fluid attenuating outlet with the oppositely disposed fluid attenuating outlets of each pair of fluid attenuating passages being disposed at preselectively opposed angles to define a preselected include angle in excess of approximately ninety-five (95) degrees so that the fluid attenuating outlet pairs are so angularly positioned relative each of the fluid material outlets to be more in opposition to each other to provide a high velocity, turbulent, pulse-like, sinusoidal attenuated fibrous flow from each of the fluid material outlets to thus increase the rate of fibrous layer attenuation; a heating means cooperative with the unitary die body whereby heat is conducted to the fluid material passages and the fluid attenuating passages; and, an insulating means cooperative with the heating means to appropriately insulate portions of the same. In addition, the present invention provides fluid treating passages cooperative with the fluid outlets to treat the layered fibrous material so as to avoid subsequent bonding between collected adjacent facing fibrous layers and to reduce bonding of fibers within each layer thus increasing layered fibrous filter media web bulk with accompanying increased dust holding capacity and overall filtering efficiency.

Finally, the present invention provides a unique, layered, fibrous fluid filter media web of melt blown fibrous material comprising; at least two freely separable face-to-face melt blown layers of fibrous filter media free of face-to-face layer bonding with the fibers in each layer having a minimum bonded relation to each other, providing a layered fibrous filter media of increased bulk with accompanying increased dust holding capacity and overall filtering efficiency.

It is to be understood that various changes can be made by one skilled in the art in one or more of the process steps and in one or more of the several parts of the die apparatus and resulting product without departing from the scope or spirit of the present invention. For example, it would be possible with a mere ready change of nose and lip sections to vary the cross-sectional geometry and fiber count produced and to vary fiber diameter from one die source to an adjacent die source, all within a unitary die source body.

BRIEF DESCRIPTION OF THE DRAWINGS

Referring to the drawings which schematically disclose one advantageous embodiment of the present invention.

DETAILED DESCRIPTION OF THE INVENTION

Figure 1:
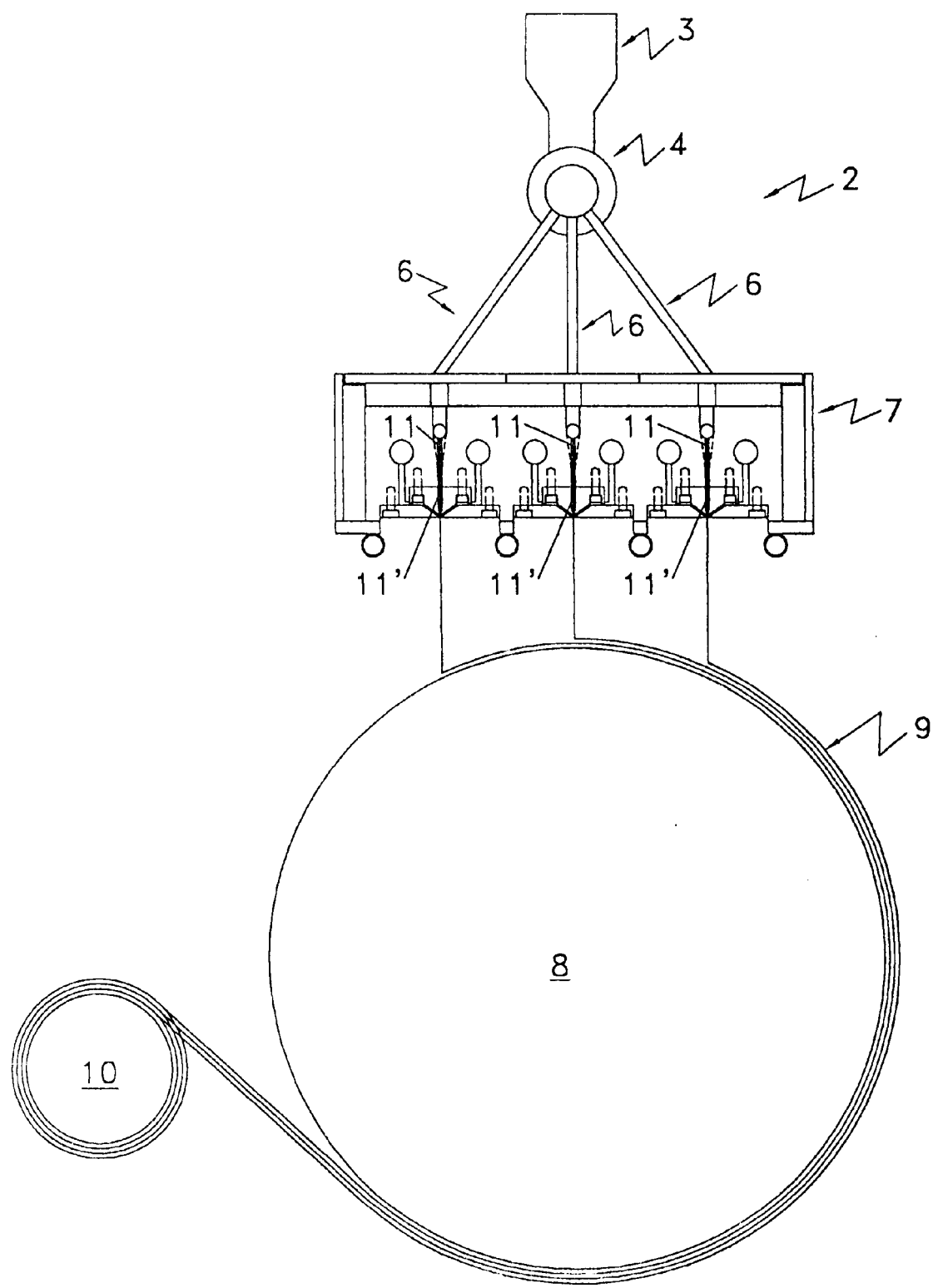
FIG. 1 is a schematic cross-sectional view of the overall structure incorporating the inventive unitary melt blown die body and a drum collector positioned in spaced relation therebelow to receive and collect melt blown fibrous layers in a facing layer-upon-layer web.

Referring to FIG. 1 of the schematic drawings, a spinning assembly 2 is schematically disclosed as including a fluid material feed hopper 3, a motor driven (not shown) extruder 4, fluid material feeder conduits 6, the inventive unitary die body 7 and a spaced fibrous web rotating drum collector 8 for collecting the novel layered fibrous web 9 thereon to be fed to winder 10, the overall spinning assembly 2 including a feed hopper, extruder, feeder conduits, die body, collector—either of drum or endless belt type—and winder being generally known in the art.

Figure 2:
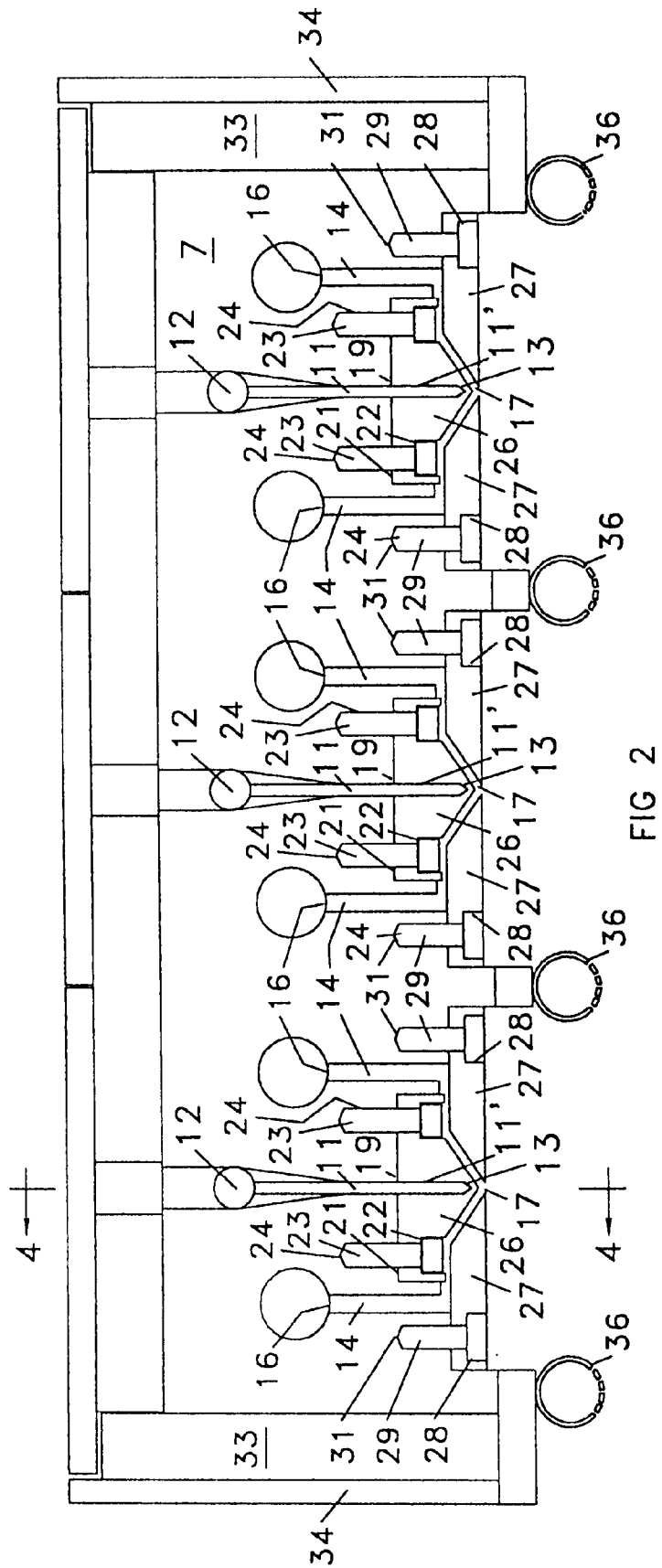
FIG. 2 is an enlarged cross-sectional view of the novel die body structure of FIG. 1.
Figure 3:
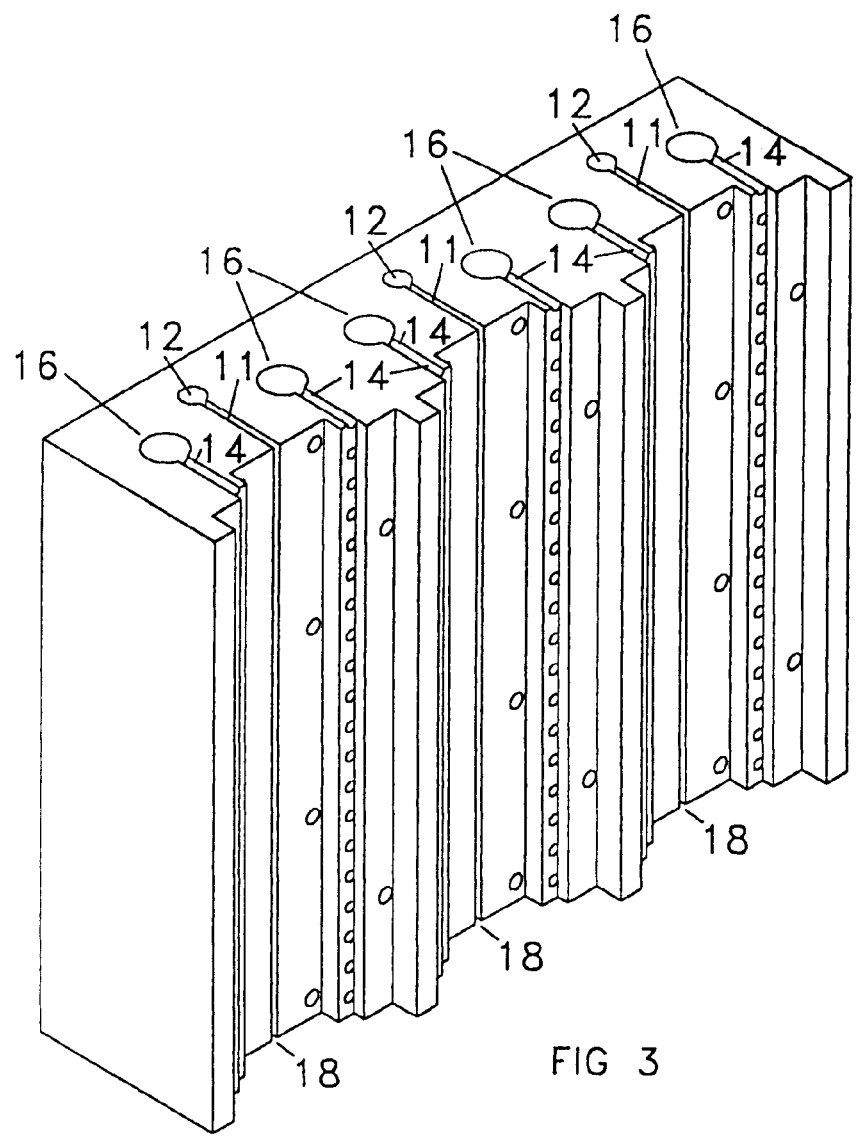
FIG. 3 is an isometric view of the unique die body disclosed in FIGS. 1 and 2 with the spaced, removable nose sections and fluid passage lip sections of FIGS. 1 and 2 removed; and, FIG. 4 is a cross-sectional view taken in a plane through line 4—4 of the enlarged view of FIG. 2, disclosing in longitudinal form the fluid material feed structure in cooperation with a spinneret orifice plate in the removable nose sections.
Figure 4:
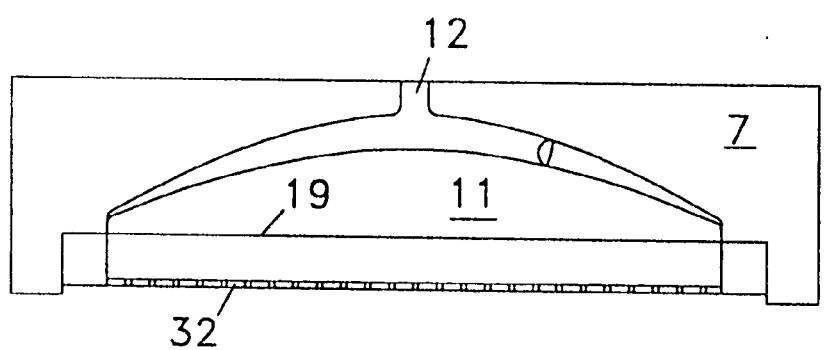

Referring to the enlarged schematic arrangement of FIGS. 2–4 of the drawings, details of the inventive features of the novel die apparatus and process for forming the novel layered web of fibrous filter media 9 can be seen in detail. In accordance with the present invention, longitudinally extending unitary die body 7 can be formed as such unitary die body member (FIG. 3) from a suitable, preselected heat conducting material, such as a nickel-chromium steel, it being understood that other types of suitable, readily formed, heat conductive materials also could be utilized. Unitary longitudinally extending die body 7 has formed therein, either by precision casting or precision drilling, a plurality of preselectively spaced fluid material flowthrough slotted material passages 11, three such slotted material passages being shown in the drawings. In order to provide for a final layered product, it is to be understood that at least two such slotted fluid material flow-through passages are required in the longitudinally extending, unitary die body 7 with the spacing of the slotted material passages 11 being compatible with the geometry and size of drum 8 or an endless belt collector (not shown). Each fluid material slotted passage 11 has a fluid material receiving inlet 12 to be connected to the aforedescribed feed hopper 3, extruder 4 and one of feeder conduits 6 disposed externally of unitary die body 7. Each fluid material slotted passage 11 is further provided with a fluid material slotted dispensing outlet 13, which outlet is located in the communicating removable nose section as described more fully hereinafter. The longitudinally extending unitary die body 7 further is provided with pairs of oppositely disposed rows of spaced fluid attenuating flow-through passages 14 with one pair of opposed rows of spaced attenuating passages 14 serving the opposite sides of each fluid material slotted flow-through passage 11 in die body 7. Like slotted flow-through material passages 11, each pair of rows of spaced passages 14 serving as oppositely disposed slotted fluid attenuating passages can be formed in unitary die body 7 by precision casting or precision cutting. Each spaced fluid attenuating flow-through passage 14 of each pair of spaced rows is provided with a fluid attenuating manifold inlet 16 connected to a suitable pressured air source external of die body 7 and not shown and a fluid attenuating outlet 17. As is described more fully hereinafter, opposed fluid attenuating outlet pairs 17 (FIG. 2) are formed by the flanks of a removable, longitudinally extending nose section of triangular cross-section and one pair of oppositely disposed and spaced mirror-image removable longitudinally extending lip sections.

Referring particularly to FIG. 3 of the drawings, it can be seen that one side of longitudinally extending unitary die body 7 is provided with three longitudinally extending, cross-sectionally stepped recesses 18. Each of these longitudinally extending stepped recesses 18 serves to snugly receive in nesting relation the longitudinally extending base portion 21 of a longitudinally extending nose section 19, which nose section 19 also can be formed as a single, unitary piece from a suitable heat conductive material such as nickel-chromium steel similar to the material of unitary longitudinally extending unitary die body 7. Each longitudinally extending nose section 19 is appropriately provided with a plurality of spaced taps 22 through the longitudinally extending side wing portions of longitudinally extending nose section 19 to receive in nesting relation the heads of fastening screws 23 which engage in the spaced taps 24 in longitudinally extending unitary die body 7.

As can be seen in FIG. 2 of the drawings, each longitudinally extending nose section 19 is so formed as to provide a longitudinally extending apex portion 26 extending from nestable base portion 21, this apex portion 26 also is centrally longitudinally slotted as at 11' so as to mate with and provide a communicating continuation of longitudinally extending fluid material dispensing slot 11 in longitudinally extending unitary die body 7 with the fluid material outlet 13 of slot 11' being adjacent the apex of the nose section to cooperate with an orificed longitudinally extending spinnerette plate mounted at the apex of longitudinally extending nose section 19 (described hereinafter).

It is to be noted that longitudinally extending apex portion 26 of longitudinally extending nose section 19 is of triangular cross-section with the included angle defining the apex of the cross-sectional triangle being preselectively in excess of ninety-five (95) degrees. It is recognized that the nose section thickness and strength to prevent cracking near the tip vicinity of the nose section orifice increases as the included angle increases.

In accordance with the present invention the included angle of the triangular cross-section is selectively in the range of approximately ninety-five (95) degrees to one hundred and twenty 120) degrees and advantageously is approximately one hundred and eight (108) degrees plus or minus two (2) degrees. Since the oppositely and inwardly sloping side flanks of the longitudinally extending apex portion 26 of longitudinally extending nose section 19 each serve as one defining wall of the opposed terminal portion of fluid attenuating passages 14 and the cooperating parallel and chamfered spaced edge end faces of opposed mirror-image longitudinally extending removable lip sections 27 serve as the other defining walls of the terminal portions of passages 14, the defined fluid attenuating outlets 17 are so angularly positioned on opposite sides of fluid material outlets 13 as to be more in opposition to each other to provide a turbulent pulse-like, sinusoidal attenuating fibrous flow from each of fluid material outlets 13 to thus increase the rate of fibrous layer attenuation from each outlet 13 in accordance with one feature of the present invention. In accordance with still another feature of the present invention, the removable longitudinally extending lip sections 27, as can be seen in FIG. 2 and 3 are each provided with longitudinally spaced, tapped recesses 28 adjacent the side opposite the chamfered end edge of each of the opposed lip sections. These tapped recesses 28 serve to receive the heads of fastening screws 29, which like screws 23, engage in spaced taps 31 of unitary die body 7 to hold the removable lip section pairs 27 in fast passage defining position. It is to be understood that the spacing and geometric configuration of the lip sections 27 can be varied to determine the velocity and angle of the fluid attenuating stream.

As can be seen in FIG. 4 of the drawings, the cross-section of each of the longitudinally extending slot type fluid material flow-through passages 11 is formed in unitary die body 7 in a hanger type shape, such a hanger-type shape for fluid material passages being long known in the art. As aforedescribed elongated, slotted passages 11 communicate with passages 11' in nose sections 19 when they are removably mounted in the stepped recess 18 of the unitary die body 7. Formed in the apex portion 26 of each nose section 19, also in a manner known in the art, is an orifice plate 32. Each orifice plate 32 includes at least one row of spaced fibrous fluid emitting apertures therein. In accordance with still another feature of the present invention, these spaced apertures advantageously number approximately thirty (30) per inch, each being preselectively sized and geometrically shaped to determine the size and cross-sectional shape of the layered fibrous material passing therethrough. It is to be understood that like lip section pairs 27, the nose sections 19 can be readily replaced with other type lip and nose sections having differing designs including but not limited to geometrically differing orifice arrangements and sizes.

Referring once again to FIG. 1 of the drawings, it can be seen that unitary die body 7, can advantageously be provided with an aluminum alloyed, electric coil heating jacket 33 cooperatively surrounding the unitary die body 7 to conduct heat to fluid passages 11 and 14 therein. A suitable ceramic insulating jacket 34 cooperatively surround the outer face of heating jacket 33. It is to be understood that the present invention is to be considered as not limited to the specific heating and insulating arrangements as shown but that other heating and insulating arrangements can be employed without departing from the scope or spirit of the invention disclosed herein.

In accordance with still another feature of the present invention, as can also be seen in FIG. 1 and FIG. 2, spaced, apertured fluid conduits "6" can be fastened to the unitary die body 7 to be cooperative along opposite sides of each fluid material dispensing outlet 13 at the apex of nose section 19 and opposed lip sections 27 to treat emitted layered fibrous material with a solidifying, cooling fluid such as blower driven cool or ambient air. Such a solidifying treatment serves to avoid subsequent bonding of collected adjacent facing fibrous layers and to reduce the bonding of individual fibers within each layer to thus increase media bulk with accompanying increased dust holding capacity and overall efficiency.

In carrying out the inventive process for forming a layered web of fibrous filter media wherein adjacently facing layers of fibrous filter media are distinctly separate from each other, polymer filter media fibers are sequentially fed in heated form, the polymer media advantageously having a viscosity in the range of at least ten (10) to three hundred (300) poise. The polymer is fed from at least two and advantageously several preselected spaced heated melt blown die source orifice rows as fiber forming layers with at least ten (10) to fifty (50) fibers per inch and advantageously and at least approximately thirty (30) fibers per inch with the fibers having been heated in the melt blown die sources to a temperature within the approximate range of four hundred (400 F) to nine hundred (900 F.) degrees Fahrenheit. The output of melt blown material per each orifice of a die source orifice row advantageously is in the range of zero point one (0.1) to two point eight (2.8) grams per minute. The fibers attenuated from the orifice rows of each die source advantageously can have a diameter in the range of zero point three (0.3) to twenty (20) micrometers in diameter and the polymer material can be but is not limited to polyester having a density of approximately one point four (1.4) grams per cubic centimeter, a polypropylene having a density of approximately zero point nine (0.9) grams per cubic centimeter or a nylon having a density of approximately one point one four (1.14) grams per cubic centimeter. In accordance with one feature of the present invention, the emitted fibers from each row of spaced orifices are attenuated by pairs of oppositely directed fluid air stream advantageously at a rate of up to six hundred (600) feet per second, the air streams advantageously being heated to a temperature of approximately seven hundred (700 F) degrees Fahrenheit. These oppositely directed air streams are so angularly directed as to include an angle between opposed streams in excess of approximately ninety-five (95) degrees, desirably within an approximate range of ninety-five (95) to one hundred twenty (120) degrees and advantageously at one hundred eight (108) degrees plus or minus two (2) degrees. This angular direction of the opposed attenuating fluid streams serves to provide a turbulent fiber flow, increasing the rate of fiber attenuation. In accordance with still another feature of the present invention, a cooling treatment of the attenuated fibers with cool air is applied to either side of each of the layer rows of fibers at the fiber attenuation location in order to enhance crystallization before the fibers are collected in face-to-face layered form on a collector, such as a revolving drum or endless belt. This treatment serves to avoid bonding between adjacent layer faces and to reduce fiber bonding within each layer so as to increase filter media bulk with accompanying increased dust holding capacity and overall efficiency.

In accordance with still another feature of the present invention, a unique and novel filter media is produced by the apparatus and method described herein, such unique filter media includes a layered fibrous fluid filter media web of melt blown fibrous material comprising at least two or more freely separable face to face melt blown layers of fibrous filter media free of layer bonding with the fibers in each layer having a minimum bonded relation to provide a fibrous filter media of maximized bulk with accompanying increased dust holding capacity and increased overall efficiency. The fibers of such novel filter media advantageously can be in the range of zero point three (0.3) to twenty (20) micrometers in diameter and can be of polymeric nature of either a polyester with a density of approximately one point four (1.4) grams per cubic centimeter or a polypropylene with a density of approximately zero point nine (0.9) grams per cubic centimeter or a nylon with a density of approximately one point one four (1.14) grams per cubic centimeter.

The invention claimed is:

1. A layered fibrous fluid filter media web of melt blow fibrous material formed from spaced die sources with cooling treatment therebetween comprising at least two freely separable and immediately face-to-face melt blown layers of fibrous filter media free of layer bonding due to enhanced crystallization of adjacent layer faces with the fibers in each layer having a minimum bonded relation providing a layered fibrous filter media material of increased filter media bulk with accompanying increased dust holding capacity and overall efficiency.

2. The layered fibrous fluid filter media web of claim 1, wherein said melt blown fibrous material has fibers with zero point three (0.3) to twenty (20) micrometers in diameter.

3. The layered fibrous fluid filter media of claim 1 wherein said melt blown fibrous material has polymeric fibers.

4. The layered fibrous fluid filter media of claim 3 wherein said polymeric fibers are a polyester having a density of approximately one point four (1.4) grams per cubic centimeter.

5. The layered fibrous filter media of claim 3, wherein said polymeric fibers are a polypropylene having a density of approximately zero point nine (0.9) grams per cubic centimeter.

6. The layered fibrous filter media of claim 3 wherein said polymeric fibers are a polyamide having a density of approximately one point one four (1.14) grams per cubic centimeter.

* * * * *